(12) United States Patent
Hoffman et al.

(10) Patent No.: US 7,657,675 B1
(45) Date of Patent: Feb. 2, 2010

(54) DYNAMIC DISTRIBUTION OF I/O RESOURCES IN A PARTITIONED COMPUTER SYSTEM

(75) Inventors: Philip Hoffman, Oreland, PA (US); Todd Little, King of Prussia, PA (US); Michael J. Saunders, Norristown, PA (US); James Thompson, West Chester, PA (US); Steven Clarke, Newtown Square, PA (US)

(73) Assignee: Unisys Corporation, Blue Bell, PA (US)

( * ) Notice: Subject to any disclaimer, the term of this patent is extended or adjusted under 35 U.S.C. 154(b) by 398 days.

(21) Appl. No.: 11/252,266

(22) Filed: Oct. 17, 2005

(51) Int. Cl.
*G06F 3/00* (2006.01)
*G06F 17/00* (2006.01)
*G06F 9/46* (2006.01)

(52) U.S. Cl. .......................... 710/60; 710/29; 705/400; 705/500; 718/104

(58) Field of Classification Search ................... 710/60; 705/52, 400–416, 500; 718/104
See application file for complete search history.

(56) References Cited

U.S. PATENT DOCUMENTS

| | | | |
|---|---|---|---|
| 6,535,939 B1 * | 3/2003 | Arimilli et al. | 710/116 |
| 7,254,652 B2 * | 8/2007 | Anderson et al. | 710/29 |
| 7,266,823 B2 * | 9/2007 | Alford, Jr. | 718/104 |
| 7,325,062 B2 * | 1/2008 | Hamilton et al. | 709/226 |
| 2002/0112102 A1 * | 8/2002 | Tarui et al. | 710/60 |
| 2003/0055602 A1 * | 3/2003 | Sato et al. | 702/182 |
| 2003/0158884 A1 * | 8/2003 | Alford, Jr. | 709/104 |
| 2005/0228850 A1 * | 10/2005 | Zhu et al. | 709/200 |
| 2006/0031444 A1 * | 2/2006 | Drew et al. | 709/223 |
| 2006/0190482 A1 * | 8/2006 | Kishan et al. | 707/103 Y |
| 2006/0248015 A1 * | 11/2006 | Baartman et al. | 705/52 |

* cited by examiner

*Primary Examiner*—Alan Chen
(74) *Attorney, Agent, or Firm*—Richard J. Gregson; Robert P. Marley; Woodcock Washburn LLP (57) ABSTRACT

A method of dynamically allocating the amount of input/output (I/O) rate capacity to partitions in a computer system includes determining a total amount of I/O rate capacity and an economic value of each partition within the partitioned computer system. The economic value is defined as a performance-valued product established for each partition wherein the sum of all performance-value products for each partition defines a total economic value for the computer. The I/O rate to be allocated to each partition is calculated to be a portion of the total amount of I/O rate capacity where the portion allocated to each partition is proportional to the economic value of that respective partition. The calculated rate allocations are recorded in memory which is accessible to each partition. After recording, each partition regulates its I/O usage according to the recorded allocation.

20 Claims, 4 Drawing Sheets

Partition 1
$P_1$=575 MIPS
$V_1$= 1.0
$EV_{1"}$= 575
$I/O_{1"}$= 207K I/O per Second

210"

Partition 2
$P_2$=250 MIPS
$V_2$= 0.5
$EV_{2"}$= 125
$I/O_{2"}$= 18K I/O per Second

220"

$EV_{TOTAL}$= 750
$I/O_{TOTAL}$= 300K I/O per Second

Partition 3
$P_3$=625 MIPS
$V_3$= 0.2
$EV_{3"}$= 125
$I/O_{3"}$= 45K I/O per Second

230"

New Partition 4

$I/O_{4"}$= 30K I/O per Second (Fixed)

| 310 | 320 | 330 | 340 | 350 |
|---|---|---|---|---|
| System Information<br><br>$EV_{TOTAL}$<br>$I/O_{TOTAL}$ | Partition A Information<br><br>$EV_A$<br>$I/O_A$<br>Dynamic | Partition B Information<br><br>$EV_B$<br>$I/O_B$<br>Dynamic | Partition C Information<br><br>$EV_C$<br>$I/O_C$<br>Dynamic | Partition D Information<br><br>$EV_D$<br>$I/O_D$<br>Fixed |

DYNAMIC DISTRIBUTION OF I/O RESOURCES IN A PARTITIONED COMPUTER SYSTEM

REFERENCE TO CO-PENDING APPLICATIONS

The following co-pending, co-owned applications have subject matter in common with the present application:
"Method for Economic Valuation in Partitioned Computer Systems", U.S. patent application Ser. No. 10/744,111, filed on Dec. 23, 2003; and
"System and Method for Licensing and Distribution of I/O in Partitioned Computer Systems", U.S. patent application Ser. No. 10/942,466 filed on Sep. 16, 2004, which are hereby incorporated by reference in their entirety into the present application.

FIELD OF THE INVENTION

The current invention relates generally to data processing systems, and more particularly to methods of managing I/O resources in a partitioned computer system.

BACKGROUND OF THE INVENTION

Many businesses are challenged with ensuring that their data processing systems keep pace with expanding and peak demands. As a result, data processing systems have been developed that have adaptable performance mechanisms for providing additional performance when needed. Commonly-assigned U.S. patent application entitled "Authorization Key System for Selectively Controlling the Performance of a Data Processing System", Ser. No. 09/676,162 filed Sep. 29, 2000, and which is incorporated herein by reference in its entirety, discloses an exemplary system employing processor keys to assist in the adaptation of system resources to user needs.

Other adaptive data processing systems have been developed that utilize hardware and software elements constructed to accommodate a partitioning of the computer system for multiple user purposes. A partitioned system may be established as a result of a contract for computer services between a business user and a computer supplier. A partition is a grouping of resources that are allocated to execute in a cooperative manner to perform one or more assigned tasks. Each partition determined in the contract may specify an instruction processor (IP) performance level so that a business user can apply the partition to computing tasks that his business needs to perform.

For example, a partition may be formed that includes one or more predetermined instruction processors (IPs) and Input/Output Processors (IOPs), and a predetermined memory range within a shared main memory. A second partition may be created to include different processors, IPs and IOPs, and another memory range. Each of these partitions may operate independently from the other so that a number of tasks may be executed in parallel within the system. When a system needs to be changed to adapt to a changing business requirement, the partitions can be redefined. For instance, if needed, all resources may be allocated to the same partition and assigned to execute a single high-priority task.

Just as additional processors may be employed to adapt to a changing business requirement by engaging additional processors, so too can memory be expanded in a partition. It may be desirable for input/output (I/O) functions to be expanded as well as processor and memory capacity in order to meet a changing customer need. Commonly-assigned U.S. patent application entitled "System and Method for Licensing and Distribution of I/O in Partitioned Computer Systems", which is incorporated herein by reference in its entirety, discloses a method for expanding I/O capacity in partitioned computer systems. In that disclosure, a user may adjust the amount of I/O capability commensurate with changing needs.

However, it is not always convenient to for a user to intervene and select the correct amount of I/O capability. Thus, there is a need for a method in partitioned computer systems to automatically adjust the amount of I/O in accordance with partitioned computer system needs. The present invention addresses the aforementioned needs and solves them with additional advantages as expressed herein.

SUMMARY OF THE INVENTION

In one embodiment, I/O rates for each partition in a computer system are proportionally allocated. The sum of all rates in the individual partitions equal the total permissible rate allocation for the entire computer system. Each partition within the computer system is assigned an economic value which corresponds to the MIPS used by the partition times a relative value of the partition in the system. A user may reallocate MIPS from one partition to another and thus change the economic value of the partitions. A change in MIPS usually necessitates a change in I/O utilization. According to one aspect of the embodiment, the I/O rates for each active and dynamically re-allocatable partition are adjusted upon a change in economic value for the partition. The adjustment is made proportional to the economic value of the partition with respect to the total economic value of the computer system and the total amount of I/O rate provided to the computer system. The embodiment provides for both dynamically re-allocatable partitions and statically fixed I/O allocations for partitions.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
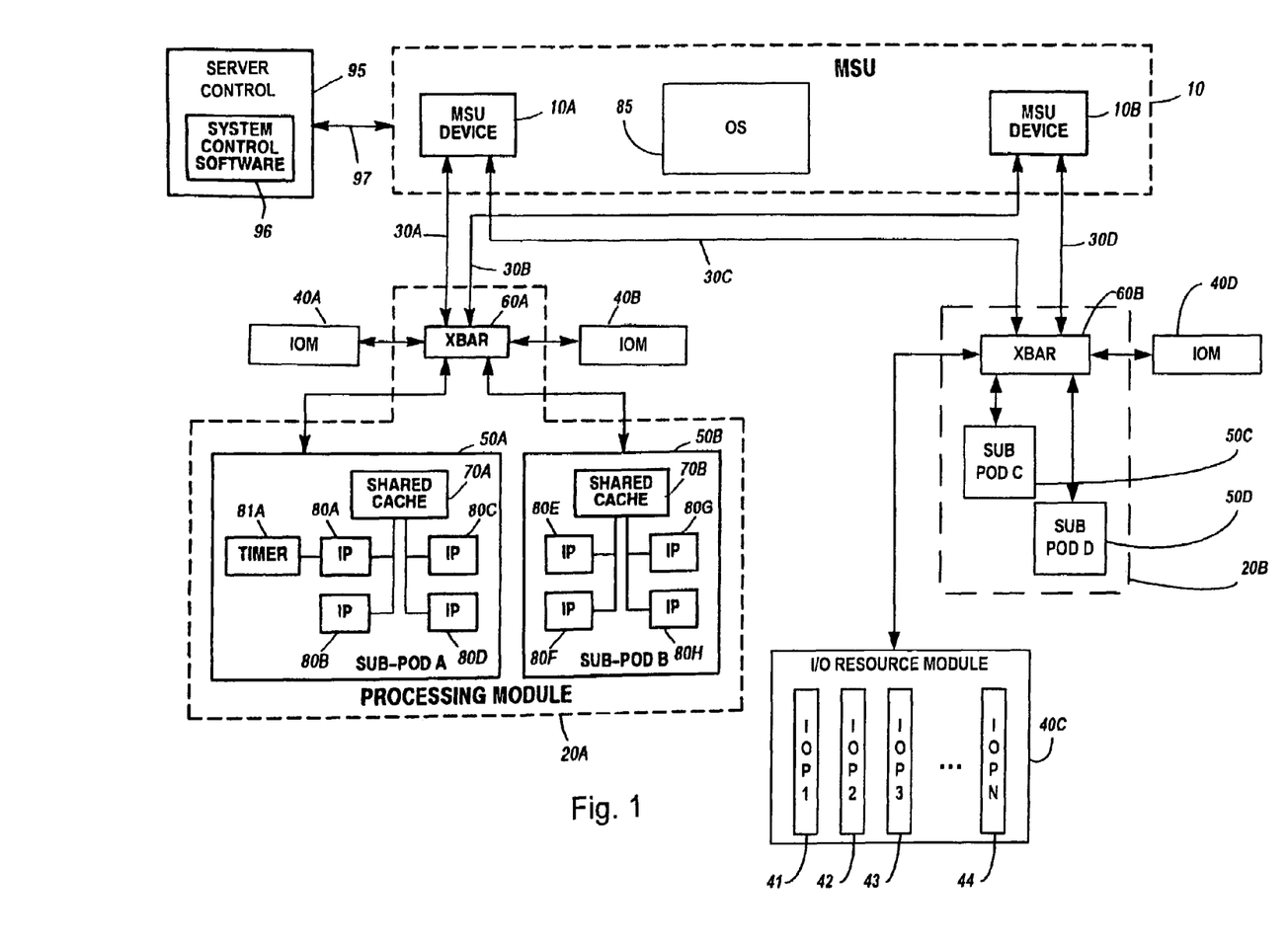
FIG. 1 is a block digram of an exemplary system that may employ the current invention.

FIG. 1 is a block diagram of an exemplary system that may employ the current invention. This system includes a Memory Storage Unit (MSU) 10 (shown dashed) which provides the main memory facility for the system. The MSU includes one or more MSU devices individually shown as MSU 10A and MSU 10B, which each contains a predetermined portion of the memory space of the system. Many more MSU devices may be included within a full configuration.

The system further includes processing modules (PODs) 20A and 20B (shown dashed), which provide the processing capability for the system. A greater or lesser number of PODs may be included in the system than are shown in FIG. 1. In one embodiment, up to four PODs are included in a fully populated system.

Each of the PODs is coupled to each of the MSU devices via a dedicated, point-to-point connection referred to as an MSU Interface (MI), individually shown as MIs 30A, 30B, 30C and 30D. For example, MI 30A interfaces POD 20A to MSU device 10A, and MI 30B interfaces POD 20A to MSU 10B device. Other MI units are similarly interfaced to other PODs.

Each POD includes two sub-processing modules (Sub-PODs) and a crossbar module (XBAR). For example, POD 20A includes sub-PODs 50A and 50B and XBAR 60A; POD 20B includes sub-PODs 50C and 50D and XBAR 60B. Other PODS and XBARS are similarly configured. Each sub-POD is interconnected to the respective crossbar module (XBAR) through a dedicated point-to-point interface.

The system of FIG. 1 may further include Input/Output modules (I/Os) individually shown as I/Os 40A through 40D. The I/O modules provide the interface between various Input/Output devices or communications links and a respective one of the PODs 20. Each I/O module is coupled to a POD via the POD's XBAR. For example, I/O 40A is coupled to XBAR 60A. XBAR 60A buffers data for the respective sub-PODs 50A and 50B and I/O modules 40A and 40B and functions as a switch to route data between any of these sub-PODs and I/O modules to an addressed one of the MSU devices 10A and 10B. Each of the input/output resource modules 40A, B, C and D contain input/output processors (IOPs) 41, 42, 43 and 44. Each IOP preferably contains multiple I/O channels, each channel being capable of transfer rate control via the local IOP.

In the exemplary system of FIG. 1, each sub-POD includes a shared cache and one or more Instruction Processors (IPs). For example, sub-POD 50A includes shared cache 70A and IPs 80A, 80B, 80C and 80D; sub-POD 50B includes shared cache 70B and IPs 80E, 80F, 80G and 80H. Other sub-PODs are similarly configured. In one embodiment, a sub-POD 50 may include between one and four IPs 80. Each IP may include one or more dedicated caches and interface logic for coupling to the interface with the shared cache. The shared cache stores data for each of the IPs within its sub-POD. Finally, each IP includes a quantum timer shown as timer 81A for IP 80A. This timer has many uses, including the facilitation of multi-tasking for the respective IP.

The system of FIG. 1 includes at least one instance of an Operating System (OS) that is loaded into MSU 10 to control the system. OS 85 is shown generally occupying memory included within MSU 10, and it will be understood the selected memory range in which OS 85 resides will actually be provided by one of MSU devices 10A or 10B.

Finally, the system of FIG. 1 includes a system server 95, which may be a workstation, personal computer, or some other processing system executing system control software 96. This system server 95 is coupled to the other units in the system via a scan interface 97. Although for simplicity, the scan interface is shown coupled solely to MSU 10, it will be understood it is coupled to the other units in the system as well. System server 95 provides all initialization, maintenance, and recovery operations for the system via the scan interface. In addition, system server 95 may be employed by an operator to perform configuration activities.

The architecture of FIG. 1 may be utilized to construct a system of multiple partitions within a data processing system. A partition is a grouping of resources that are allocated to execute in a cooperative manner to perform one or more assigned tasks. For example, a partition may be formed that includes one or more predetermined instruction processors (IPs) and Input/Output Processors (IOPs), and a predetermined memory range within a shared main memory. A second partition may be created to include different IPs, IOPs, and another memory range. Each of these partitions may operate independently from the other so that a number of tasks may be executed in parallel within the system. When system needs change, the partitions can be redefined by the system provider or by the user of the system. For instance, if needed, all resources may be allocated in the same partition and assigned to execute a high-priority task.

It will be appreciated that the system of FIG. 1 is merely provided as an example computing environment in which the present invention may operate. Any other data processing system having any other type of configuration that includes partitions may usefully employ the inventive system and method to be discussed in the following paragraphs. With the foregoing available for discussion purposes, the current invention is described in regards to the remaining drawings. Initially, a brief discussion of processor and I/O keys is provided below.

Processor and I/O Keys

A partition is a grouping of resources that are allocated to execute in a cooperative manner to perform one or more assigned tasks. A partitioned computer system provides that each partition has processor, memory and I/O resources. The system manufacturer provides a key to the system user so that specific partition resources are made available to the system user. Computing performance in partitioned computer systems may be determined by the use of a processor key. A processor key enables functionality within a partition and may establish processor performance limits within the partition. Generally, there may be one processor key per established partition. The processor key for the partition defines baseline and ceiling processor performance parameters, expiration date and a maximum time of use for the identified partition. Co-owned patent application entitled "System and Method for Licensing and Distribution of I/O in Partitioned Computer Systems" discloses the use of processor and I/O keys and is incorporated herein by reference.

A processor key may be used to indicate that an I/O key is needed to establish I/O performance for a given partition. Since a processor key may be read first in a partitioned computer system, the processor key can provide the first indication to a computer system that an I/O key is needed to authorize the use of I/O resources. In the discussion that follows, an I/O licensed system, defined by a processor key is assumed for example purposes. The processor key may indicate whether an I/O licensing key is required. In one embodiment, the processor key is examined by a software support module (IP1SUPPORT) running on an instruction processor (IP) in association with an operating system. The I/O software support module is a program that contains an object library that manages licensing aspects of the present invention. An example operating system is the Master Control Program (MCP) available from Unisys® Corporation.

Economic Value

In one aspect of the invention, I/O capacities may be distributed according to the economic value of partitions in a computer system. The creation of partitions for different tasks may be defined in a contract of sale for the use of processor performance within the computer system. The tasks performed within the partitions have a business value to the computer performance purchaser. This business value may be apportioned according to the value of the task in relation to the business being conducted. Commonly-assigned U.S. patent application entitled "Method for Economic Valuation in Partitioned Computer Systems", which is incorporated herein by reference in its entirety, discloses a method for providing an economic valuation of partitions in a computer system. Using that method, a partitioned computer system economic valuation is established for each partition using a relative value of tasks performed in each computer partition. Considering the throughput assigned to each partition, an economic value of each partition is established. The sum of the economic values equals the fixed economic value of the computer system. If a user wishes to move functionality from one partition to another to accommodate some changing circumstance, the economic value of individual partitions may change, but not the total economic value of the entire system unless additional capacity is procured. An example partitioned computer system is shown in FIGS. 2A and 2B.

Figure 2A:
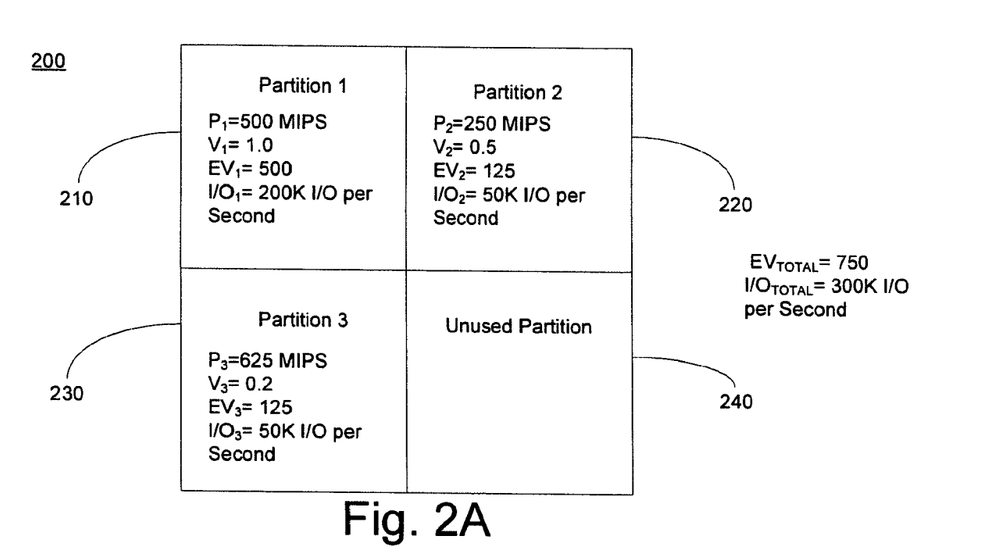
FIG. 2A is a diagram of an exemplary partitioned computer having an economic valuation per partition.
Figure 2B:
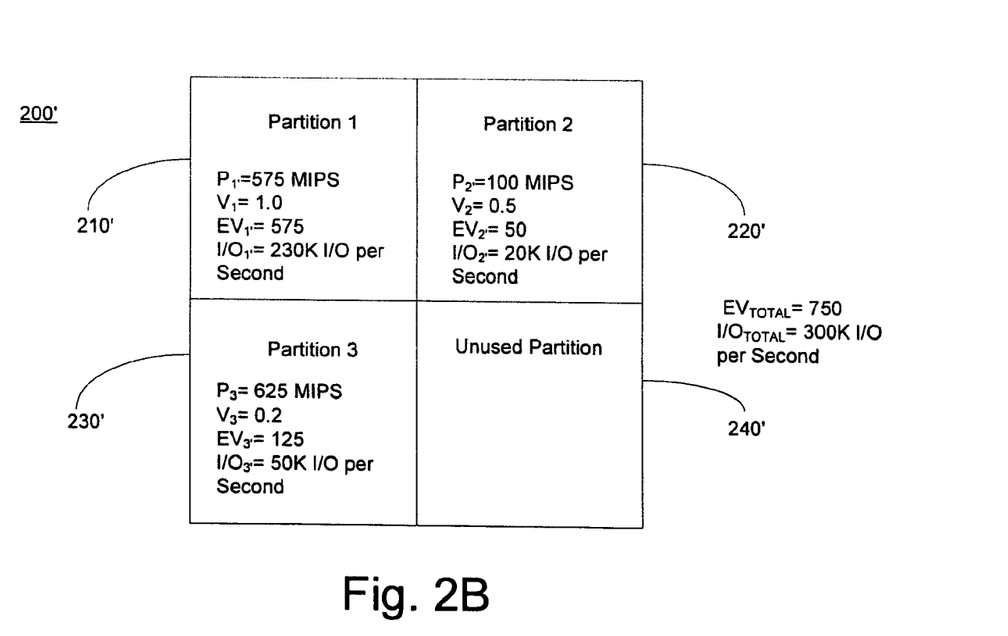
FIG. 2B is a diagram of a modified exemplary partitioned computer system showing a change in economic valuation per partition.

FIG. 2A and 2B represent different states of an economic valuation of a portioned system. In this example, a system 200 is defined where three partitions are created. A first partition 210 may represent a partition used for manufacturing purposes. The second partition 220 may represent an accounting partition. A third partition 230 may represent an engineering partition and a fourth partition 240 is unused. For the particular computing system 200 shown, the relative values of each partition are as follows:

| | |
|---|---|
| Manufacturing | 1.0 |
| Accounting | 0.5 |
| Engineering | 0.2 |

The metrics of 1.0, 0.5 and 0.2 may represent relative economic values of the various tasks associated with the three active partitions of the computer system. Each of the partitions may be allocated a MIPS value based on an assessment of the need for processing the task associated with the partition. In the FIG. 2A example, the manufacturing, accounting, and engineering tasks may require processing performance of 500, 250 and 625 MIPS respectively.

FIG. 2A represents the partitioned system 200 architected for the exemplary manufacturing business. The first partition, 210, represents the manufacturing task. Partition 1 has a processing power $P_1$ of 500 MIPS and relative value $V_1$ of 1.0. A relative economic value ($EV_1$) for partition 1 is the product $P_1V_1$. Thus, in this example, partition 1 has an economic value of 500. The second partition 220 represents the accounting task. Partition 2 has a processing power $P_2$ of 250 MIPS and relative value $V_2$ of 0.5. A relative economic value ($EV_2$) for partition 2 is the product $P_2V_2$. Thus, in this example partition 2 has an economic value of 125. The third partition, 230 represents the engineering task. Partition 3 has a processing power $P_3$ of 625 MIPS and relative value $V_3$ of 0.2. A relative economic value ($EV_3$) for partition 3 is the product $P_3V_3$. Thus, in this example, partition 3 has an economic value of 125. Although processing capability for another partition may exist in the exemplary computer model of FIG. 2A, the additional capability may remain unused 240.

The sum of the economic values of each partition equals the economic value of the entire system ($P_1V_1 + P_2V_2 + P_3V_3 = EV_{TOTAL}$). In the current example, the economic value of the system totals to 750. Once established by a contract between a computer system seller and a customer, the economic value of the system remains fixed unless subsequent arrangements are made between the seller and customer to increase the total economic value of the system. Once a total economic value of a system is established by contract, even if the system user redistributes the tasks between and among partitions, the total economic value of the system does not change. In other words, the user may redistribute tasks between and among the partitions of a system, but must do so within the constraints of the established total economic value of the system such that the total economic value is not exceeded. However, the economic value of the system may change when a system user purchases more or less IP performance in any one of the existing partitions or in a new partition.

Even if the user moves tasks from one partition to another to accommodate changes in business processing needs, the economic value of the system is preserved. A numerical example of a change in partitions is illustrative of the advantage in maintaining a fixed economic valuation for the system.

Referring to the partitioned system 200' of FIG. 2B, if a user wished to move a portion of the processing tasks and capability of the second partition 220' into the first partition 210', then partition 1 may gain processing responsibility if partition 1 is not already at its maximum performance level. In the example instance, 150 MIPS of throughput from partition 2 is desired to be moved to partition 1. Note that only an equivalent economic value of the selected portion of partition 2 may be moved to partition 1. In the case of FIG. 2B, the breakdown of the economic value of the new first partition 210' is:

$$P_{1'}V_{1'} = P_1V_1 + P_2V_2 = (500 \times 1.0) + (150 \times 0.5) = 575$$

and the economic value of the second partition $EV_{2'}$ is reduced to $P_{2'}V_{2'} = 100$ MIPS. Note that the economic value of the system is preserved at $$P_{1'}V_{1'} + P_{2'}V_{2'} + P_3V_3 = EV_{system} = 575 + 50 + 125 = 750 \text{ as before.}$$

One advantage of the economic valuation is the ability to bill the customer for actual usage according to the economic value of the partition. For example, the billing rates for the three partitions of FIGS. 2A and 2B may be the same as originally established both before and after the performance redistribution. The only difference is that there is more performance to bill at the first partition rate and lower performance to bill at the second partition rate. The third partition rate and volume remains unchanged in the example.

Dynamic I/O Resource Allocation

The concept of economic valuation in a partitioned computer system may be used to advantage in the current invention to assist in the dynamic allocation of I/O resources in a partitioned computer system. For example, given that an I/O key specifying an I/O system rate capacity of 300 K I/O's per second, the present invention can allocate the I/O rate among active partitions in a manner that corresponds with the economic value of each partition.

Returning to FIG. 2A, the economic value is determined as described above as being $EV_1=500$ for partition 1 in a system whose total economic value $EV_{TOTAL}=750$. A proportional amount of I/O rate allocation for this partition, based on the various active partition economic values may be calculated as:

$$I/O_1=(EV_1/EV_{TOTAL}) \times I/O_{TOTAL}=(500/750) \times 300=200 \ K \ I/O \ \text{per second.}$$

Likewise, for partition 2:

$$I/O_2=(EV_2/EV_{TOTAL}) \times I/O_{TOTAL}=(125/750) \times 300=50 \ K \ I/O \ \text{per second.}$$

Likewise for partition 3:

$$I/O_3=(EV_3/EV_{TOTAL}) \times I/O_{TOTAL}=(125/750) \times 300=50 \ K \ I/O \ \text{per second.}$$

Where $I/O_1+I/O_2+I/O_3=I/O_{TOTAL}=300K$ I/O per second.

As an aspect of the current invention, the system level I/O rate capacity is allocated proportionally to the economic value of the partition. Thus, in the case of FIG. 2A, the first partition 210 has the highest economic value and thus the highest allocation of 200K I/O per second. The second partition 220 has a lower economic value and its proportional I/O allocation is 50 K I/O per second. The third partition has the same economic value as the second partition even though the processor instruction throughput of this partition is higher than the second partition ($P_2V_2=P_3V_3$). Since the economic values are the same, partitions 2 and 3 receive the same I/O rate allocation. Thus, as an aspect of the invention, if a redistribution of processing power is made, by for example, an adjustment from the user, then the allocation of I/O resources will follow the economic value calculated for the active partitions.

Returning to FIG. 2B, the distribution of I/O is responsive to the change in processor power in economically valued computer partitions. If processor power is redistributed from the second partition 220' to the first partition 210' in FIG. 2B, then I/O resources change to accommodate that adjustment. In the example of FIG. 2B, 150 MIPS of processor power valued at 0.5 was moved to the first partition to result in an economic value of $EV_1$ of 575 in the first partition 210' and an economic value $EV_2$ of 50 in the second partition 220'. The economic value of the third partition 230' remains unchanged at 125. Following the rule for I/O allocation as described above, the various active partition economic values may be calculated as:

For partition 210':

$$I/O_{1'}=(EV_{1'}/EV_{TOTAL}) \times I/O_{TOTAL}=(575/750) \times 300=230 \ K \ I/O \ \text{per second.}$$

Likewise, for partition 220':

$$I/O_{2'}=(EV_{2'}/EV_{TOTAL}) \times I/O_{TOTAL}=(50/750) \times 300=20 \ K \ I/O \ \text{per second.}$$

Likewise for partition 230':

$$I/O_{3'}=(EV_{3'}/EV_{TOTAL}) \times I/O_{TOTAL}=(125/750) \times 300=50 \ K \ I/O \ \text{per second.}$$

Where $I/O_{1'}+I/O_{2'}+I/O_{3'}=I/O_{TOTAL}=300K$ I/O per second.

Notice that redistribution of the I/O rate capacity results in a redistribution that does not exceed the total amount of I/O rate capacity in the given system. The total I/O rate capacity of the system may be increased or decreased with a corresponding change in an I/O key. However, absent a new overall rate change authorized by an I/O key change, the I/O capacity of the system is maintained and allocated across all active partitions. As can be well appreciated by those of skill in the art, the addition of a new partition in a computer system would result in a redistribution of both processing power and I/O allocation in accordance with the principle of economic valuation of both the overall system and individual partitions (as long as the processor key permits a new partition to be added).

The above describes aspects of the invention where all partitions in a computer system are allowed to be dynamic. However, in some circumstances, the user may desire the ability to fix the I/O capacity in a partition such that it does not change and cannot be altered by a redistribution in another partition. The example of FIG. 2C demonstrates aspects of a combined fixed and dynamic allocation of I/O capacity in a partitioned computer system.

Figure 2C:
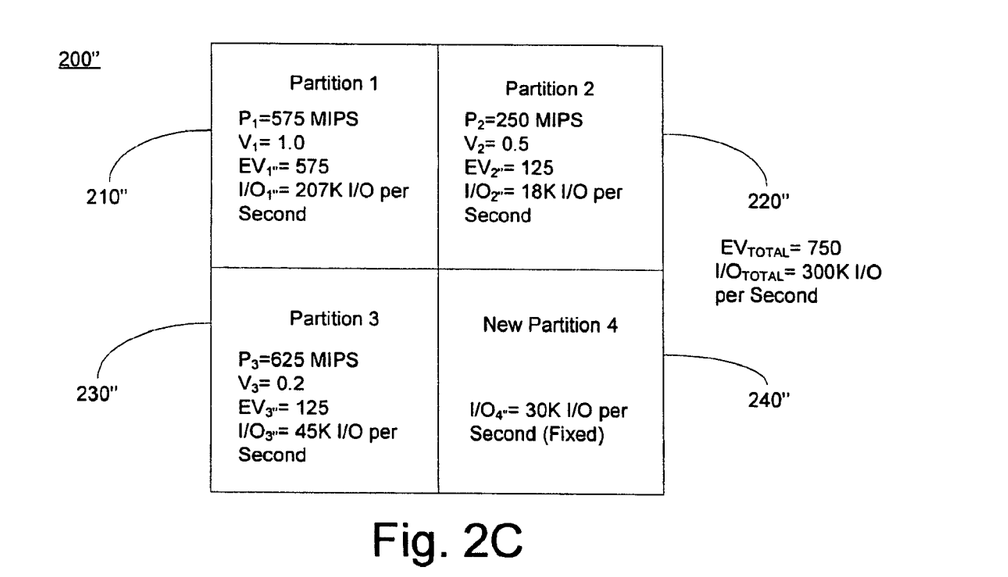
FIG. 2C is a diagram of a modified exemplary partitioned computer system showing an addition of a new fixed partition.

FIG. 2C depicts an example partitioned computers system using economic valuation in the distribution of I/O resources where a new fixed partition is added. A fourth partition 240" is added in the example of FIG. 2C. Ignoring for the moment the allocation of processing power to the new partition 240", the user chooses to assign the new partition as having a fixed I/O allocation of 30K I/O per second. Typically, the user may use a computer user interface to accomplish the task of changing an existing partition or adding another partition, such as a fourth partition in FIG. 2C. In one embodiment, the user interface may correspond to a server controller 95 as in FIG. 1. Assume for the purpose of the example that the system is transitioning from the system example of FIG. 2B to that of FIG. 2C and that the system level I/O capacity is still fixed at 300 K I/O per second. According to an aspect of the invention, dynamic allocation of the I/O resources for non-fixed or dynamic computer partitions may be calculated using that portion of the available I/O capacity that is not fixed. In this example, the I/O allocation for each partition may be calculated as:

for partition 210":

$$I/O_{1''}=(EV_{1''}/EV_{TOTAL}) \times (I/O_{TOTAL}-I/O_{FIXED})=(575/750) \times (300-30)=207 \ K \ I/O \ \text{per second.}$$

Likewise, for partition 220":

$$I/O_{2''}=(EV_{2''}/EV_{TOTAL}) \times (I/O_{TOTAL}-I/O_{FIXED})=(50/750) \times (300-30)=18 \ K \ I/O \ \text{per second.}$$

Likewise for partition 230":

$$I/O_{3''}=(EV_{3''}/EV_{TOTAL}) \times (I/O_{TOTAL}-I/O_{FIXED})=(125/750) \times (300-30)=45 \ K \ I/O \ \text{per second.}$$

$I/O_{4''}=30$ K I/O per second (Fixed)

Where $I/O_{1''}+I/O_{2''}+I/O_{3''}+I/O_{4''}=I/O_{TOTAL}=300K$ I/O per second.

Figure 3:
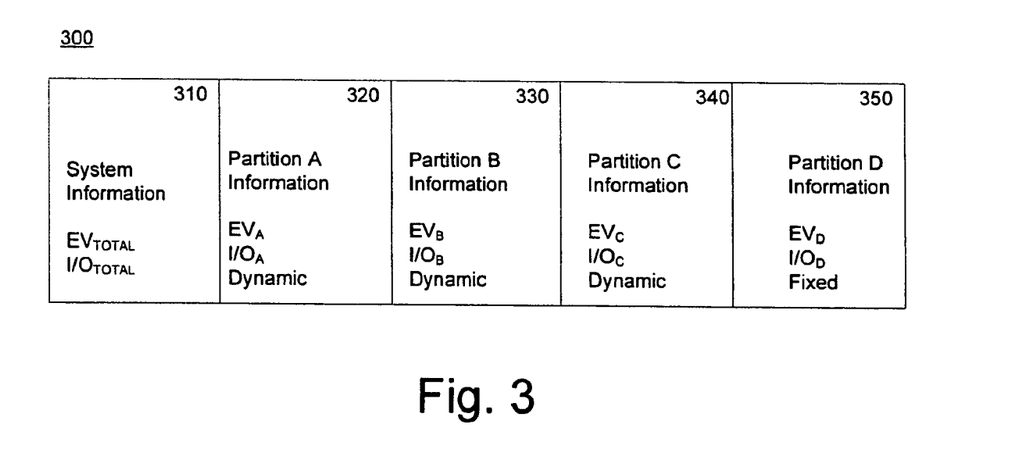
FIG. 3 is a diagram of a memory having partitioned computer system information.

Thus, as an aspect of the current invention, dynamic reallocation of active computer partitions may occur in the presence of fixed I/O rate partitions. In one embodiment of the invention, the calculation of how much of the total I/O capacity is retained in each partition is calculated once a second by each partition in turn. FIG. 3 depicts a shared memory 300 which may be used by each partition to monitor the performance of the I/O allocation technique.

In one embodiment, a monitor software program in each partition runs at a periodic interval to verify that the partition is performing within the overall system limits. When the monitor program executes, for example in partition 320, it accesses the current values for economic valuation, I/O allocation, and information regarding whether the I/O allocation is statically fixed in value or dynamic for each partition. The monitor program also accesses the system information 310 and performs the calculations as described above to check the allocation of I/O allocation for all partitions including itself.

If the calculations indicate that I/O allocation in any partition needs to be adjusted, the monitor program writes in the new values into each memory location 320-350 for each partition in the system. If the calculation indicates the a new I/O rate be established for the partition running the monitor program, then the partition moves to adjust the I/O rate accordingly. One period later, the next partition, for example partition B 330 runs its copy of the monitor program and makes the calculations for the system. If the results indicate that a relocation of I/O rates among the partitions be performed, the new values are written into the shared memory 300 as before and acted upon.

In one embodiment, this process continues periodically in all partitions such that all partitions have examined and verified that they are allocated the appropriate amount of I/O rate resources. Thus, if a momentary violation occurs, such as when a user may create a new partition and allocate a fixed amount to the I/O resources, then the other partitions will exceed the total system limit momentarily. However, the use of the monitor software in each partition, operating in a periodic manner, balances out the system so the total I/O rate allocation, as defined by an I/O key, for the system is preserved.

Figure 4:
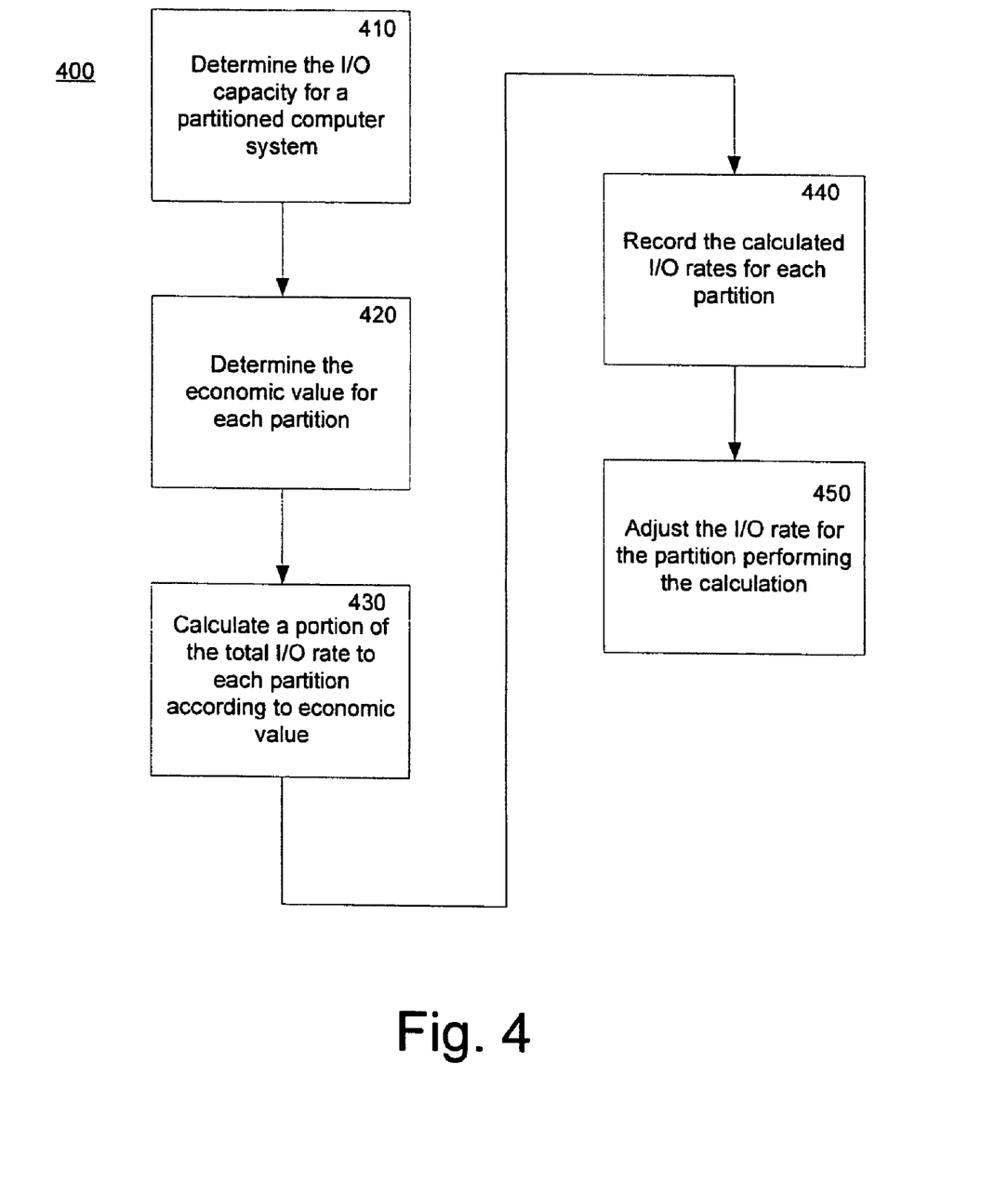
FIG. 4 is a flow diagram describing a method of the invention.

FIG. 4 depicts a method 400 having aspects of the invention. The flow diagram of FIG. 4 assumes the use of a partitioned computer system having at least two partitions. The computer system is assumed to have an economic valuation using the principles described earlier above. The flow of FIG. 4 may be performed by each partition running monitor software which can verify that the I/O rate allocation to each partition is commensurate with the total I/O rate capacity allocated to the entire system.

The example method 400 of FIG. 4, performed by each partition, begins by determining the total I/O capacity for the partitioned computer system (step 410). In one embodiment, the determination of total I/O capacity may be obtained using a monitoring program that reads the I/O capacity information placed in a memory location. The I/O capacity can be previously written into the memory location by a controller, such as a license monitoring application running within one of the computer partitions, after reading I/O key information. The memory location may be an area in memory available to all partitions such that all partitions may read the total I/O capacity value. The monitor program can then modify some data in that memory area as needed to distribute the I/O among the active partitions.

The partition, using a monitoring program and executing the method 400, determines the economic value for each partition in the computer system (step 420). In one embodiment, this step may be performed by accessing information concerning each partition, such as the area of memory mentioned above, that is accessible to all partitions containing relevant information such as the economic value of a partition and the total I/O rate allotment for the computer system.

The partition executing the method 400 calculates the portion of the total I/O rate allotment for each partition including its own. Accordingly, the partition performing the calculation has access to the characteristics of each partition. For example, each partition may determine, through access to an area of memory, that a particular partition is labeled as being dynamic or static. A dynamic partition may have its I/O rate adjusted according to the economic value of the partition within the system. A static partition has a fixed allocation of I/O rate that is not affected by activities occurring in other partitions. Each partition has access to the current allocation of I/O resources and may calculate an updated allocation of I/O resources. Examples of such updates are provided in the discussion of FIGS. 2A-2C above.

In one embodiment, the partition executing the method 400 may optionally record the calculated I/O rates for each partition in an area of memory accessible by all partitions (step 440). The partition executing the method may then adjust the I/O rate allocation based on the new calculated value of I/O rate for the partition (step 450). In one embodiment, step 450 may also allow adjustment of the rate of all other partitions to the system based on the specific new I/O rate values calculated for each partition. In this embodiment, the calculation of new I/O rates for each partition is enforced after the new I/O rates for each partition are written into the area of memory available to all partitions. In this embodiment, data logging options are also available such that the I/O calculation history of each partition may be tracked.

In one aspect of the invention, method 400 may be repeated periodically in each partition. Thus, the computer system can respond to load changes in partitions which affect the economic values of those partitions. Overall, momentary violations of the overall I/O rate of the system may sometime occur. For example, if a user defines a partition to become fixed at a certain I/O rate above the operating dynamic rate for that partition, then the system overall encounters a violation of the maximum system I/O rate allocation. However, each partition periodically performs the method of FIG. 4. Thus, each partition provides regulation so that all partitions respond to the change induced by the user.

As mentioned above, while exemplary embodiments of the invention have been described in connection with various computing devices, the underlying concepts may be applied to any computing device or system in which it is desirable to implement an economic value-based I/O rate allocation method. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

While the present invention has been described in connection with the preferred embodiments of the various figures, it is to be understood that other similar embodiments may be used or modifications and additions may be made to the described embodiment for performing the same function of the present invention without deviating therefrom. Therefore, the invention should not be limited to any single embodiment, but rather should be construed in breadth and scope in accordance with the appended claims.

What is claimed:

1. A method of dynamically allocating the amount of input/output (I/O) rate capacity to partitions in a computer system, the method comprising:
   determining a total amount of I/O rate capacity of the computer system;
   determining an economic value of each partition within the partitioned computer system, the economic value for each partition comprising a product of a measure of processing performance required to perform one or more tasks on the partition and a measure of the relative value of said one or more tasks with respect to tasks performed by other partitions, wherein the sum of the economic values of each partition defines a total economic value for the computer system; and
   calculating a portion of the total amount of I/O rate capacity to allocate to each partition, the allocated portion to each partition being proportional to the economic value to a respective partition.

2. The method of claim 1, further comprising:
   recording the allocation to each partition in memory accessible to each partition such that each partition is adjusted to the respective recorded allocation.

3. The method of claim 2, further comprising:
   adjusting an I/O rate in a first partition according to an allocation calculated for the first partition.

4. The method of claim 3, further comprising:
   accessing a program associated with a second partition; and
   adjusting an I/O rate in the second partition according to an allocation calculated for the second partition.

5. The method of claim 3, further comprising:
   automatically adjusting an amount of I/O rate to the first partition to be commensurate with a change in economic value in the first partition.

6. The method of claim 1, wherein said determining the total amount of I/O rate capacity of the computer system and said determining the economic value of each partition within the partitioned computer system comprises: reading the total amount of I/O rate capacity and the economic value of each partition from at least one of a processor key, an I/O key and an area of memory.

7. The method of claim 1, wherein said calculating the portion of the total amount of I/O rate capacity to allocate to each partition, the allocated portion to each partition being proportional to the economic value to a respective partition comprises: calculating a new I/O rate for each partition using a ratio of economic value in a partition to the total economic value of the computer system multiplied by the total I/O rate capacity of the computer system.

8. A computer system comprising:
   multiple active partitions within the computer system, each active partition having at least one processor;
   an allocation of economic valuation for each partition within the computer system, the economic valuation of each partition comprising a product of a measure of processing performance required to perform one or more tasks on the partition and a measure of the relative value of said one or more tasks with respect to tasks performed by other partitions, wherein the sum of the economic values of each partition defines a total economic value for the computer system;
   a shared memory comprising economic valuation information for each partition and a total input/output (I/O) rate capacity for the computer system, wherein each partition has access to the shared memory;
   software, executing on each partition, that allocates a portion of the total I/O rate capacity for the computer system to each partition, the portion allocated to each partition proportional to the economic valuation of each partition and the total I/O rate capacity for the computer system.

9. The system of claim 8, wherein said each active partition is designated one of a dynamic partition and a static partition, wherein said dynamic partitions have I/O rate allocations which can be reallocated based on the economic valuation of each partition.

10. The system of claim 8, further comprising:
    a user interface wherein a user may alter the performance of at least one partition, the alteration causing a redistribution of I/O rate allocation among dynamic partitions of the computer system.

11. The system of claim 8, wherein the software acts to execute instructions corresponding to the steps of:
    determining said total amount of I/O rate capacity of the computer system and said economic valuation of each partition within the partitioned computer system; and
    calculating said portion of the total amount of I/O rate capacity to allocate to each partition, the allocated portion of each partition being proportional to the economic value to a respective partition.

12. The system of claim 11, wherein the software further executes instructions corresponding to the steps of:
    recording the allocation of a portion of the total I/O rate capacity for the computer system which corresponds to each partition; and
    adjusting each partition to function within the respective allocated portion of the total I/O rate capacity.

13. The system of claim 8, wherein the allocation of economic valuation for each partition comprises a product of a million instructions per second (MIPS) rating for each partition and a relative value of each partition within the computer system.

14. The system of claim 8, wherein the software calculates said allocated portion of the total I/O rate capacity by using a ratio of economic value in a partition to the total economic value of the computer system multiplied by the total I/O rate capacity of the computer system.

15. A computer-readable medium having instructions therein, executable by a computer system having multiple partitions to perform a method of dynamically allocating an amount of input/output (I/O) rate capacity to partitions in said computer system, the method comprising:

determining a total amount of I/O rate capacity of the computer system;

determining an economic value of each partition within the partition computer system, the economic value for each partition comprising a product of a measure of processing performance required to perform one or more tasks on the partition and a measure of the relative value of said one or more tasks with respect to tasks performed by other partitions, wherein the sum of the economic values of each partition defines a total economic value for the computer system; and calculating a portion of the total amount of I/O rate capacity to allocate to each partition, the allocated portion to each partition being proportional to the economic value to a respective partition.

16. The computer-readable medium of claim 15, wherein the method further comprises:

recording the allocation to each partition in memory accessible to each partition such that each partition is adjusted to the respective recorded allocation.

17. The computer-readable medium of claim 16, wherein the method further comprises:

adjusting an I/O rate in a first partition according to the recorded allocation for the first partition.

18. The computer-readable medium of claim 17, wherein the method further comprises:

accessing a program associated with a second partition;

recording the allocation to each partition in the memory accessible to each partition; and adjusting an I/O rate in the second partition according to an allocation recorded for the second partition.

19. The computer-readable medium of claim 15, wherein the method steps of determining the total amount of I/O rate capacity of the computer system and determining the economic value of each partition within the partitioned computer system comprise reading the total amount of I/O rate capacity and the economic value of each partition from one of a processor key and an area of memory.

20. The computer-readable medium of claim 15, wherein the method step of calculating the portion of the total amount of I/O rate capacity to allocate to each partition, the allocated portion to each partition being proportional to the economic value to a respective partition comprises calculating a new I/O rate for each partition using a ratio of economic value in a partition to the total economic value of the computer system multiplied by the total I/O rate capacity of the computer system.

* * * * *